June 10, 1969  N. N. RUBIN  3,449,581
AMPLIFYING LIGHT CONDUCTING CONDUIT WITH
LIGHT PASSAGE INTERRUPTING MEANS
Filed Nov. 30, 1965

INVENTOR
NORMAN N. RUBIN

BY Claude Funkhouser
ATTORNEY

United States Patent Office 3,449,581
Patented June 10, 1969

3,449,581
AMPLIFYING LIGHT CONDUCTING CONDUIT WITH LIGHT PASSAGE INTERRUPTING MEANS
Norman N. Rubin, Silver Spring, Md., assignor to the United States of America as represented by the Secretary of the Navy
Filed Nov. 30, 1965, Ser. No. 510,706
Int. Cl. H01j *31/50*
U.S. Cl. 250—213                                          4 Claims

ABSTRACT OF THE DISCLOSURE

A light conducting conduit formed of a plurality of light conducting rods ground at the forward end in the form of a lens. It has means for amplifying the picture picked up by the forward lens and means for interrupting the passage of light through the rods. It may be used in the nose or sides of a plane to provide a pilot with a forward or laterial picture on a screen in the cockpit.

---

The invention described herein may be manufactured and used by or for the Government of the United States of America for governmental purposes without the payment of any royalties thereon or therefor.

The invention relates to a light conducting conduit or a means by which the different intensities of light which make up the average scene may be transmitted to a viewing screen. It is particularly related to the transmission of light along a plurality of glass fibers and means for modifying that light during the transmission.

In the manufacture of modern airplanes to which this particular adaption of the invention is applied, the high speed of the plane makes the windshield or windscreen a hazardous and detrimental portion of the airplane. In order for the pilot to see through the windshield, it is desirous that the shield be normal to the line of sight of the pilot. With the speeds at which the present day planes fiy, this is impractical so the windshields are raked at an angle so great that the pilot is practically looking through the windshield edgewise. The transmission of light through such an angled windshield is greatly reduced to the extent that at least thirty percent of the light is reflected. With the windshield set at the acute angle, the pilot has great difficulty in seeing, especially in landing. The use of television screens has the objection of being dependent upon a power supply, the failure of which leaves the pilot blind.

The object of the present invention is to provide an apparatus which will present to the pilot a clear view forward and downward and to present such view on a screen which is substantially vertical to his line of sight and which is free from distortion.

Another object of the present invention is to provide a light conducting conduit, one end of which may be placed at the extreme forward portion of the plane and the other end terminate in a position convenient for viewing by the pilot.

It is a further object of the present invention to provide a light conducting conduit formed of a plurality of glass fibers, each extending as a unit from a forward position in a plane to a screen adjacent the pilot seat and to so form these glass fibers that they each taper from a forward diameter of approximately .005 inch to an enlarged terminal diameter of approximately .015 inch It is still another object of the present invention to provide a light conducting conduit which is formed of a plurality of tapered glass fibers, each extending from a forward position in the plane to a viewing screen in the compartment occupied by the pilot and to so maintain the individual fibers throughout the extent of the conduit that they will be in the same relation to each other at the forward end as at the terminal end.

It is a still further object of the present invention to provide a light conducting circuit formed of a bundle of tapered glass fibers, one end of the circuit receiving light rays and the other end emanating said light rays onto a viewing screen, with means located between the ends for amplifying the intensity of the light passing through the individual fibers.

It is a still further object of the present invention to provide a light conducting circuit having means for blacking out the transmission of light through the circuit under conditions predetermined as to the intensity of the light.

It is a still further object of the present invention to provide a light conducting circuit made up of a plurality of individual glass fibers arranged in the same relationship to each other at each end and to provide a band of selenium around each of the individual fibers to detect the intensity of the light passing through that particular fiber and to amplify said signal initiated by the detector cell and feed said amplified signal back into the individual fiber in the form of light energy to increase the light intensity at the terminal end of the conduit proportionally to that received at the forward end of the conduit.

Other objects, advantages and novel features of the invention will become apparent from the following detailed description of the invention when considered in conjunction with the accompanying drawings wherein.

Figure 1:
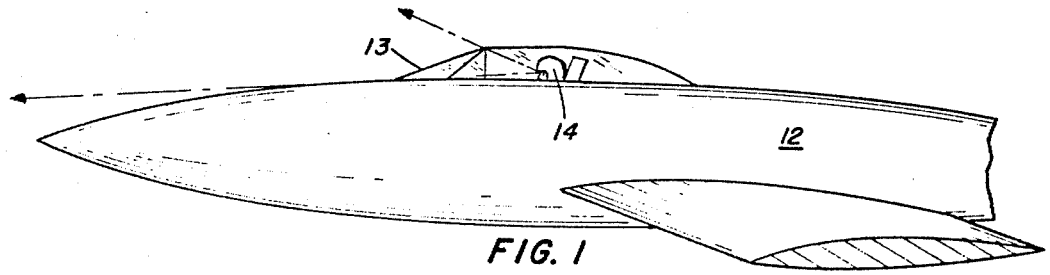
FIG. 1 is a side elevation of existing aircraft showing the profile of the windshield as it projects into the airstream.

Referring now to the drawings wherein like parts are referred to by like numbers, with attention to FIG. 1, an airplane 12 of the type having a windshield 13 set at an acute angle to the line of vision is illustrated. The projection of the windshield above the plane body and into the path of the airstream presents serious difficulties, both in the vision of the pilot 14 and in the results caused by the projection above the body of the plane, when the plane is traveling above 1500 m.p.h.

Figure 2:
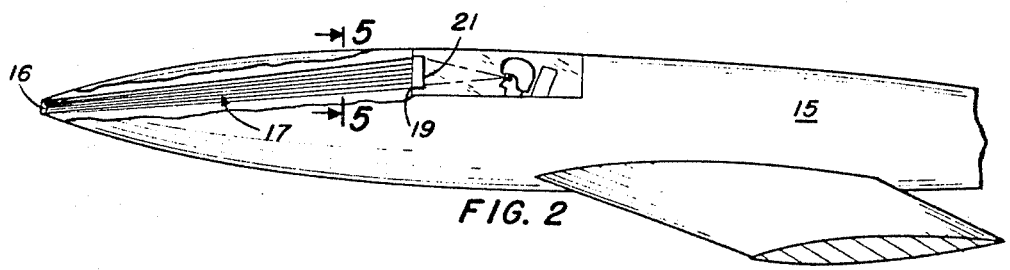
FIG. 2 is a view of the proposed aircraft with the present invention serving in place of the windshield.
Figure 3:
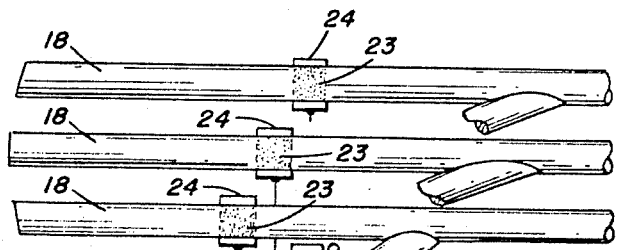
FIG. 3 is a diagrammatic view of several individual fibers illustrating the detector collar, the amplifying unit and the feedback.
Figure 4:
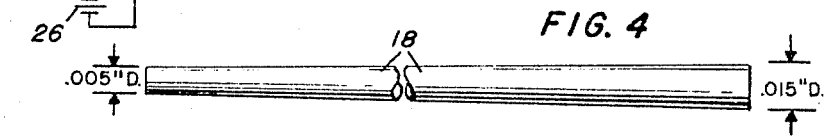
FIG. 4 illustrates the tapering of the individual fibers, in exaggerated form.

With reference to FIG. 2, a plane 15 is illustrated with the invention applied. The forward portion of the plane is fitted with the forward end 16 of a light conducting conduit 17 ground to a lens formation to serve as the eye of the plane. Light picked up by the forward end 16 is transmitted through the individual fibers 18 of the light conducting circuit to the terminal end 19 which is fitted with a viewing screen 21. Thus, a picture is presented to the pilot 22 which is a replica of the scene picked up by the forward end 16 with a light loss of approximately 30%. While the present invention shows only one light conducting conduit, it is, of course, possible to have a plurality of these conduits to present to the pilot on a series of screens any view which he might desire, giving him, if necessary, a complete 360 degree of observation.

The individual fibers making up the light conducting conduit are tapered with a forward end diameter of approximately .005 inch and a terminal diameter of approximately .015 inch. The relationship of the individual fibers to each other are maintained throughout the extent of the conduit, i.e., the lower left fiber at the forward end of the light conducting conduit will be the lower left fiber at the terminal end, so that the picture presented to the forward end 16 will be truly produced at the terminal end on the screen. The terminal end 19 is ground to blend the ends of the glass fibers, in a manner similar to that which is used in grinding eyeglasses, practically eliminating the edges of the individual fibers and the picture is focused on a viewing screen 21.

Each of the individual fibers, at a point somewhere between the forward end 16 and the terminal end 19, has its outside surface roughened as at 23. Surrounding this roughened area a band of selenium 24 is fixed to form a detector cell which initiates a current which is fed to an amplifier 25. The amplifier is powered by a battery 26 and its output is conducted to a light 27. The light 27 enhances the intensity of the light passing through the individual fiber by means of a branch fiber 28 fused into the same individual fiber from which the amplified signal was taken and produces a picture at the terminal end having light areas of increased intensity. This is particularly to be desired during night flights and gives the pilot a better picture than that received through an ordinary windshield.

Figure 5:
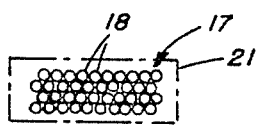
FIG. 5 is a cross-section on line 5—5 of FIG. 2.

FIG. 5 shows a cross-section through the light conducting circuit and illustrates the regular formation of the individual fibers. The viewing screen 21 is shown in dotted lines.

Figure 6:
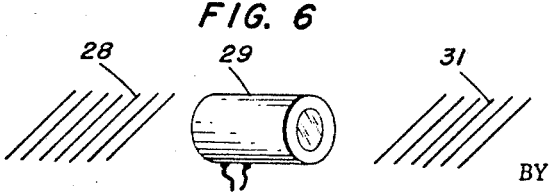
FIG. 6 is a diagrammatic representation of the safeguard feature to blackout the light transmission through the light conducting circuit.

A safeguard feature is incorporated into the conducting circuit to prevent an abnormal flash of light of high intensity, such as a nuclear explosion, from blinding the pilot. It is illustrated in one form in FIG. 6 and shows a polarizing screen 28, an electric coil 29 and a second polarizing screen 31. This apparatus is placed around the bundle of fibers and actuated from the detector cells used in the amplification process. Should light of a predetermined intensity actuate the cells, the current produced would actuate the coil 29 which would partially rotate the light rays to provide, with the polarized screens a blackout for the bundle of fibers. Attached to the bundle of fibers this arrangement would prevent the transmission of light of high intensity and prevent the blinding of the pilot.

Obviously many modifications and variations of the present invention are possible in the light of the above teachings. It is therefore to be understood that within the scope of the appended claims the invention may be practiced otherwise than as specifically described.

What is claimed is:
1. A light conducting conduit comprising:
a plurality of individual glass fibers arranged in a bundle, one end of said bundle receiving light rays, the other end dispersing said light rays, said light ray receiving end being ground as a unit to produce a light ray receiving end in the form of a lens; and
means associated with each of the individual fibers for amplifying the light passing through the fiber.
2. A light conducting conduit according to claim 1 and including a pair of polarized screens having an electric coil between them associated with the bundle of fibers to prevent passage of light therethrough.
3. A light conducting conduit according to claim 1 wherein the amplifying means comprises a selenium cell in close contact with each of the individual fibers, an amplifying unit energized by said cell, a lamp actuated by said amplifying means and a fiber branch connected to said individual fiber, said fiber branch receiving the output of the lamp.
4. A light conducting conduit comprising
a plurality of individual glass fibers formed in a bundle and extending from a light ray receiving end to a light ray emanating end, the relation of the individual fiber with each other being the same at the forward light receiving end as at the light emanating end;
a selenium band around a portion of each of the individual fibers, said band forming a detector cell actuated by the passage of light within the individual fiber;
an amplifying unit actuated by said detector cell;
a lamp receiving the output of the amplifying unit and translating said output into light energy; and
a branch fiber attached to said individual fiber and receiving the light energy from said lamp, said branch fiber channeling said light energy back into said individual fiber.

References Cited
UNITED STATES PATENTS

| | | | |
|---|---|---|---|
| 2,967,248 | 1/1961 | Nicoll | 250—213 |
| 3,273,458 | 9/1966 | Kohler | 250—227 X |
| 3,369,125 | 2/1968 | Dueker | 250—213 |

RALPH G. WILSON, *Primary Examiner.*

T. N. GRIGSBY, *Assistant Examiner.*

U.S. Cl. X.R.

250—227